(12) United States Patent
Tomala et al.

(10) Patent No.: US 11,564,271 B2
(45) Date of Patent: Jan. 24, 2023

(54) USER EQUIPMENT CATEGORY SIGNALING IN AN LTE-5G CONFIGURATION

(71) Applicant: Nokia Technologies Oy, Espoo (FI)

(72) Inventors: Malgorzata Tomala, Wroclaw (PL); Amaanat Ali, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/638,115

(22) PCT Filed: Aug. 11, 2017

(86) PCT No.: PCT/US2017/046620
§ 371 (c)(1),
(2) Date: Feb. 10, 2020

(87) PCT Pub. No.: WO2019/032124
PCT Pub. Date: Feb. 14, 2019

(65) Prior Publication Data
US 2020/0214065 A1    Jul. 2, 2020

(51) Int. Cl.
*H04W 88/06* (2009.01)
*H04W 76/15* (2018.01)
(Continued)

(52) U.S. Cl.
CPC .............. *H04W 76/15* (2018.02); *H04W 8/24* (2013.01); *H04W 28/22* (2013.01); *H04W 80/02* (2013.01); *H04W 84/20* (2013.01)

(58) Field of Classification Search
None
See application file for complete search history.

(56) References Cited

U.S. PATENT DOCUMENTS

| 10,966,270 B2 * | 3/2021 | Takahashi | ............. H04W 48/18 |
| 2018/0049214 A1 * | 2/2018 | Kubota | ................. H04W 36/32 |

(Continued)

OTHER PUBLICATIONS

International Searching Authority at the European Patent Office, International Search Report for PCT/US2017/046620, dated Mar. 29, 2018, 2 pages.

(Continued)

*Primary Examiner* — Brandon M Renner
(74) *Attorney, Agent, or Firm* — Mintz Levin Cohn Ferris Glovsky and Popeo, P.C.

(57) ABSTRACT

Methods and apparatus, including computer program products, are provided for user equipment category signaling. In some example embodiments, there may be provided a method that includes receiving, by a user equipment in dual connectivity with a master base station providing an Evolved UMTS Terrestrial Radio Access Network and with a secondary base station providing a next generation radio access network, a request for capability information; generating, by the user equipment, category information, the category information indicating, to the master base station and the secondary base station, an achievable data rate for the user equipment over the dual connectivity, the category information being common to both the Evolved UMTS Terrestrial Radio Access Network and the next generation radio access network; and providing, by the user equipment, capability information to the master base station, the capability information including the generated category information. Related systems, methods, and articles of manufacture are also described.

15 Claims, 5 Drawing Sheets

(51) Int. Cl.
  *H04W 8/24* (2009.01)
  *H04W 28/22* (2009.01)
  *H04W 80/02* (2009.01)
  *H04W 84/20* (2009.01)

(56) References Cited

U.S. PATENT DOCUMENTS

| | | | |
|---|---|---|---|
| 2019/0141770 A1* | 5/2019 | Takahashi | H04W 76/16 |
| 2019/0165894 A1* | 5/2019 | Choi | H04L 1/1812 |
| 2019/0166553 A1* | 5/2019 | Ryoo | H04W 76/28 |
| 2019/0239123 A1* | 8/2019 | Kim | H04W 88/023 |
| 2019/0281645 A1* | 9/2019 | Van Der Velde | H04L 5/00 |

OTHER PUBLICATIONS

Nokia, et al., UE categories for LTE-NR DC, 2017.
Intel Corporation, UE category for LTE-NR DC, 2017.
NTT Docomo, et al., [Draft] Reply LS on UE categories for NR and LTE-NR Dual connectivity.
$3^{rd}$ generation partnership project; technical specification group radio access network, evolved universal terrestrial radio access (E-UTRA) and NR, 2017.
"$3^{rd}$ Generation Partnership Project; Technical Specification Group Services and System Aspects; System Architecture for the 5G System; Stage 2 (Release 15)," 3GPP TS 23.501 v15.2.0 (Jun. 2018). 217 pages.
Nokia et al., "Total layer-2 buffer size for split bearer capable Ues," 3GPP TSG-RAN WG2 Meeting #89, R2-150126, Athens, Greece, Feb. 9-13, 2015. 5 pages.
Nokia et al., "UE capability structure and coordination aspects for MR-DC," 3GPP TSG-RAN WG2 NR Adhoc#2, R2-1706859, Qingdao, China, Jun. 27-29, 2017. 14 pages.
NTT Docomo, Inc., "UE categories for NR and LTE-NR Dual Connectivity," 3GPP TSG-RAN Meeting #76, RP-170993, West Palm Beach, Florida, Jun. 5-8, 2017. 1 page.

* cited by examiner

USER EQUIPMENT CATEGORY SIGNALING IN AN LTE-5G CONFIGURATION

CROSS REFERENCE TO RELATED APPLICATIONS

This application is a national-phase entry of Patent Cooperation Treaty Application No. PCT/US2017/046620 filed Aug. 11, 2017, entitled "USER EQUIPMENT CATEGORY SIGNALING IN AN LTE-5G CONFIGURATION," the content of which is hereby incorporated by reference in its entirety.

FIELD

The subject matter described herein relates to signaling the capabilities of a user equipment.

BACKGROUND

In Fifth Generation (5G) wireless networks, there may be provided extreme broadband, ultra-robust, low latency connectivity, and/or massive machine-to-machine connectivity for the Internet of Things (IoT), when compared to prior generations such as Long Term Evolution (LTE), 3G, and/or the like. With 5G, the network may include a radio access technology (RAT) referred to as New Radio (NR), which provides a wireless, radio access network to user equipment (UE). The NR access technology may further couple to a core network, such as a 5G core network (CN). In 5G, the 5G core network may support a variety of options, such as a standalone NR, a NR as an anchor with Evolved UMTS Terrestrial Radio Access (E-UTRA) extension option, a standalone E-UTRA, and an E-UTRA as the anchor with the NR extension option. These options may be in accordance with 3GPP TS 23.501, 3rd Generation Partnership Project; Technical Specification Group Services and System Aspects; System Architecture for the 5G System; Stage 2 (Release 15).

SUMMARY

Methods and apparatus, including computer program products, are provided for user equipment category signaling.

Methods and apparatus, including computer program products, are provided for user equipment category signaling. In some example embodiments, there may be provided a method that includes receiving, by a user equipment in dual connectivity with a master base station providing an Evolved UMTS Terrestrial Radio Access Network and with a secondary base station providing a next generation radio access network, a request for capability information; generating, by the user equipment, category information, the category information indicating, to the master base station and the secondary base station, an achievable data rate for the user equipment over the dual connectivity, the category information being common to both the Evolved UMTS Terrestrial Radio Access Network and the next generation radio access network; and providing, by the user equipment, capability information to the master base station, the capability information including the generated category information.

In some variations, one or more of the features disclosed herein including the following features can optionally be included in any feasible combination. The request for capability information may include a capability enquiry message. The request may indicate the request is for operation in a non-standalone, dual connectivity configuration. The category information may be generated based on a first achievable data rate between the user equipment and the master base station operating in a non-standalone, dual connectivity configuration over the Evolved UMTS Terrestrial Radio Access Network and a second achievable data rate between the user equipment and the secondary base station operating in the non-standalone, dual connectivity configuration over a next generation radio access network. The category information may be generated based on a total layer 2 buffer size at the user equipment. The user equipment capability information may be provided in a capability information message signaled to the master base station as part of radio resource control. The same category information may enable the master base station and the secondary base station to comprehend and configure the dual connectivity. The provided capability information may further include categories for standalone operation by the user equipment over the Evolved UMTS Terrestrial Radio Access Network and/or standalone operation over the next generation radio access network. The achievable data rate may represent a maximum data rate and/or a peak data rate that can be provided by the user equipment. The next generation radio access network may represent a fifth generation access network and/or a new radio access network.

In some example embodiments, there may be provided a method that includes sending, by a master base station providing an Evolved UMTS Terrestrial Radio Access Network, a request for capability information to a user equipment in dual connectivity with the master base station and with a secondary base station providing a next generation radio access network; receiving, by the master base station, capability information including category information indicating, to the master base station, an achievable data rate for the user equipment over the dual connectivity, the category information being common to both the Evolved UMTS Terrestrial Radio Access Network and the next generation radio access network; and configuring, based on the category information, the achievable data rate over a first link to the master base station and/or a second link to the secondary base station in order to configure the dual connectivity.

In some variations, one or more of the features disclosed herein including the following features can optionally be included in any feasible combination. The received category information indicating to the secondary base station the achievable data rate for the user equipment over the dual connectivity may be sent to the secondary base station. The request for capability information may request capability information from the user equipment for operation in a non-standalone, dual connectivity configuration. The category information may indicate the achievable data rate over a first downlink from the master base station to the user equipment, a first uplink from the user equipment to the master base station, a second downlink from the secondary base station to the user equipment, and/or a second uplink from the user equipment to the secondary base station. The category information may indicate the achievable data rate at a split to the secondary base station. The achievable data rate may be based on a total layer 2 buffer size at the user equipment. The user equipment capability information including the category information may be received in a capability information message signaled to the master base station as part of radio resource control. The same category information may enable the master base station and the secondary base station to comprehend and configure the dual connectivity. The received capability information may further include categories for standalone operation by the user equipment over the Evolved UMTS Terrestrial Radio Access Network and/or standalone operation over the next generation radio access network. The achievable data rate may represent a maximum data rate and/or a peak data rate that can be provided by the user equipment. The next generation radio access network may represent a fifth generation access network and/or a new radio access network.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

Figure 1A:
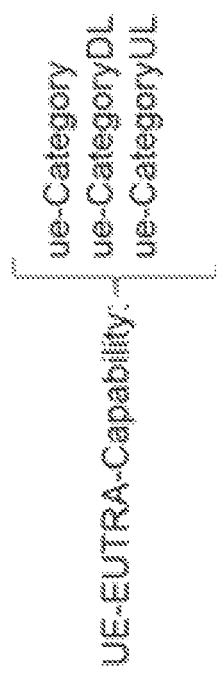
FIGS. 1A-AB depict examples of user equipment capability information including category structures for carrying the user equipment's category, in accordance with some example embodiments.

Like labels are used to refer to same or similar items in the drawings.

DETAILED DESCRIPTION

Figure 1B:
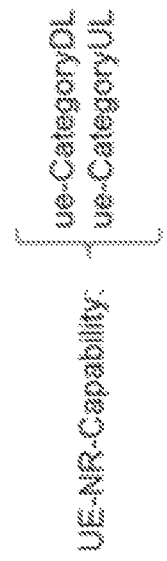

FIG. 1A depicts an example of user equipment (UE) capability information including a category structure used by the user equipment to signal its category to the E-UTRA, while FIG. 1B depicts an example of user equipment capability information including a category structure used by the user equipment to signal its category to 5G's NR. When the user equipment sends its category to the network, the network may determine the user equipment's configuration including a maximum, such as peak, data rate achievable by the user equipment.

To illustrate with the example at FIG. 1A, when the user equipment sends ue-category "4" to the E-UTRA, this category "4" may map to a maximum data rate achievable by the user equipment so the user equipment is effectively signaling to the E-UTRA a maximum achievable data rate. Moreover, when the user equipment sends ue-categoryDL "Y" and ue-categoryUL "Z" to the E-UTRA as in the structure shown at FIG. 1A, the user equipment may be signaling to the E-UTRA a maximum achievable data rate on the downlink (DL) and a maximum achievable data rate on the uplink (UL). Likewise, when the user equipment sends ue-categoryDL "6" and ue-categoryDL "1" to the E-NR as in the structure shown at FIG. 1B, the user equipment may be signaling to the E-UTRA a maximum achievable data rate on the downlink (DL) and a maximum achievable data rate on the uplink (UL). The user equipment may signal the capability information including the categories in a radio resource control (RRC) message sent to the network, such as a evolved NodeB base station (in the case of LTE's E-UTRA) or a gNodeB (gNB) base station (in the case of a 5G NR).

Dual connectivity refers to user equipment that is served by a primary cell and a secondary cell. In this way, the dual connectivity may allow a user equipment to achieve greater overall data rates by using two cells. For example, the user equipment may couple to gNB base station serving an NR access network as a secondary cell, and may couple to the eNB base station serving a primary, or anchor cell. This E-UTRA primary cell and NR secondary cell dual connectivity configuration is also referred to herein as "E-UTRA-NR DC." Although the previous example described the E-UTRA as primary, or anchor cell, and the NR as a secondary cell, the NR access network may operate as the primary cell, and the U-UTRA may operate as the secondary cell.

In the case of E-UTRA-NR DC, the user equipment capability information including the user equipment's category may be signaled by the user equipment separately to each radio access technology, such as NR and E-UTRA. This may enable the radio access technologies, such as NR and E-UTRA, to avoid having to understand the others capability information including the categories. Returning to the previous example, the primary eNB base station serving the E-UTRA may understand the E-UTRA capability of FIG. 1A, but not the NR capability information of FIG. 1B. Likewise, the secondary gNB base station serving the NR may understand the NR capability of FIG. 1B, but not the E-UTRA capability structure of FIG. 1A. Although such a simplistic structure may sound appealing from an implementation perspective, it may fail to recognize that in the case of E-UTRA-NR DC, the user equipment's capability and, in particular, its category may not be the simple sum of the maximum achievable data rate associated with the E-UTRA category and the maximum achievable data rate associated with the NR category. Suppose for example, the UE's E-UTRA category is "G" (which maps to a 10 megabit per second maximum achievable data rate) and the UE's NR category is "Z" (which maps to a 20 megabit per second maximum achievable data rate). Although these maximum achievable data rates may be representative of what the user equipment can do using a standalone, single radio access technology such as E-UTRA or NR, the user equipment may not be able to provide that simple sum, such as 30 megabits per second in this example, when the user equipment is in the E-UTRA-NR DC.

Figure 2:
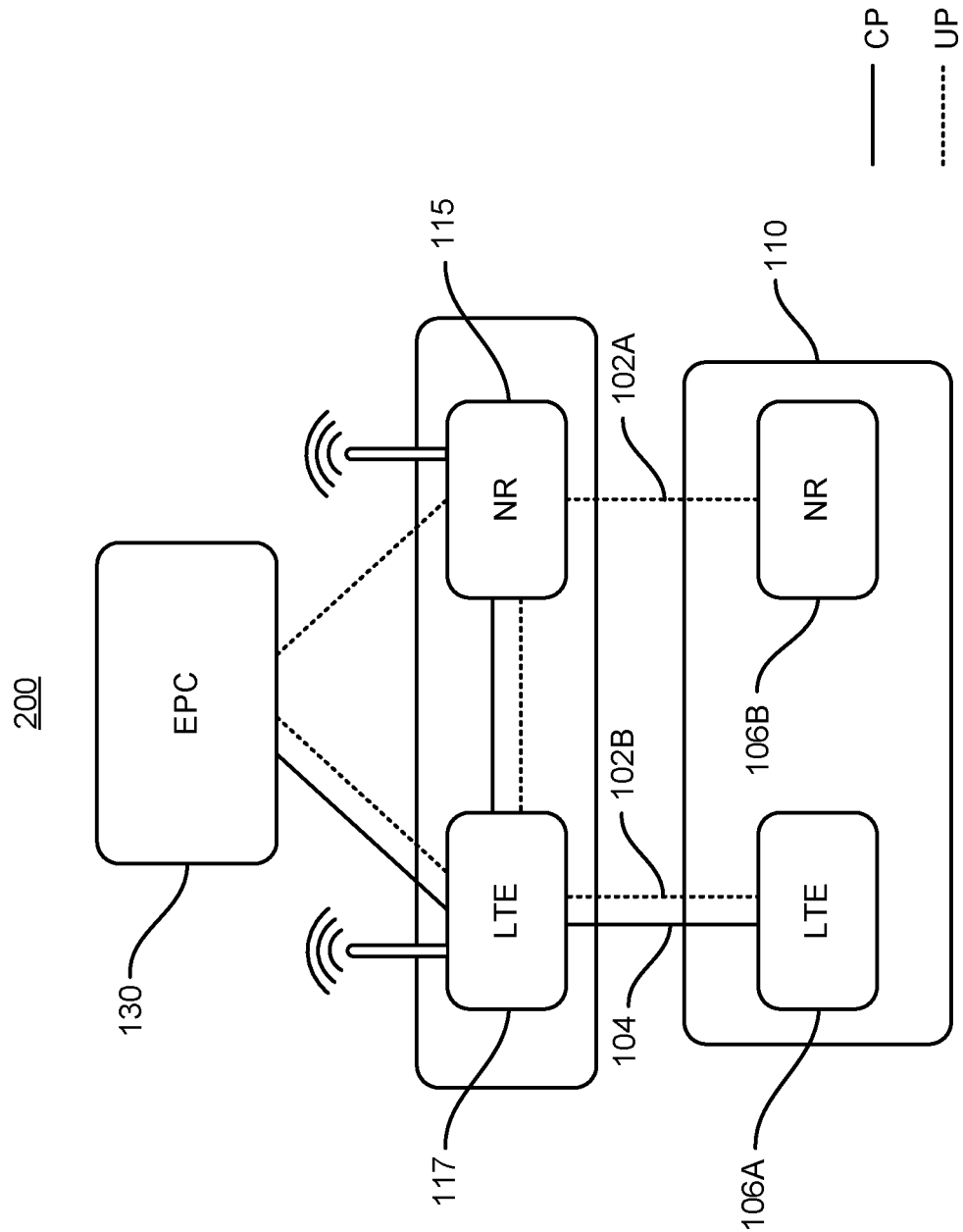
FIG. 2 depicts an examples non-standalone configurations including the E-UTRA and the NR dual connectivity configuration, in accordance with some example embodiments.

FIG. 2 depicts an example of a system 200 including a user equipment 110 in the E-UTRA-NR DC, in accordance with some example embodiments. The user equipment 110 may comprise a multi-mode radio configured to operate using an LTE radio portion 106A and an NR radio portion 106B.

System 200 may include LTE's Evolved Packet Core (EPC) 130 coupled to two radio access technologies 117 and 115. In the example of FIG. 2, an eNB base station 117 may provide an E-UTRA in accordance with, for example, LTE. Furthermore, a gNB 115 may provide a 5G NR access network. The system 200 may include other nodes, devices, and networks, such as 5G core network, and/or the like.

In the example of FIG. 2, the system 200 shows the E-UTRA-NR DC configuration. In this example, the configuration may also be referred to as a non-standalone, LTE assisted, new radio (NR) dual connectivity configuration. At FIG. 2, the user equipment 110 may have dual connectivity via user planes 102A-B to the gNB 115 and eNB 117. The control plane 104 may be provided by the eNB 117 to the user equipment 110. Also shown in FIG. 2 is the user plane (shown by dashed lines) and control plan (shown by solid lines) connectivity among the EPC 130, gNB 115, and eNB 117.

In some example embodiments, the user equipment 110 may signal to the network the user equipment capability information including category for the E-UTRA-NR DC. This "LTE-NR category" for the user equipment 110 operating in the E-UTRA-NR DC configuration may enable the network to determine the maximum achievable data rate for the user equipment while in the E-UTRA-NR DC mode. For example, the user equipment 110 may generate the LTE-NR category as a common part of the capability information. This common part may represent the capability information including the LTE-NR category, which is common to both the E-UTRA and NR while in dual connectivity so that E-UTRA's eNB base station and the NR gNB base station can coordinate, based on the LTE-NR category, the corresponding achievable data rate(s) for that category. In other words, the same LTE-NR category information may enable the eNB base station (which provides the E-UTRA) and the gNB base station (which provides the NR access network) to comprehend the LTE-NR category and then configure the user equipment including bearers and/or the like for dual connectivity. Furthermore, the user equipment's LTE-NR category may be used to by the network to determine a maximum achievable maximum data rate in the non-standalone-LTE assisted option of new radio (NR) configuration as depicted at FIG. 2.

To illustrate further, a master node, such as a eNB base station, may receive from the user equipment the LTE-NR category, which may then be associated with physical layer characteristics, such as achievable data rate. Moreover, the achievable data rate may also be represented by total L2 buffer size parameter (see, e.g., 3GPP TS 36.306), and this L2 buffer size parameter may be used by the master node (or other node) to determine the split in data rates between master node/eNB's downlink to the user equipment and the secondary node/gNB's downlink to the user equipment.

The LTE-NR category may implicitly or explicitly indicate the achievable maximum data rate. For example, the user equipment 110 may explicitly indicate the LTE-NR category as 20 gigabits per second or a value, such as an index, that represents 20 gigabits per second. Alternatively or additionally, the user equipment 110 may explicitly indicate the LTE-NR category as the user equipment's 110 total Layer 2 buffer size (which as noted can determine the achievable data rates on the split downlinks to the user equipment). To illustrate further, the LTE-NR category "X" may denote the data rate explicitly, such as 5 Gbps in the downlink (DL) and 1 Gbps in the uplink (UL). Alternatively or additionally, the LTE-NR category "X" may denote the data rate implicitly according to the LTE characteristics (e.g., where indexed category is associated with total layer 2 buffer size and number of transport block bits).

In some example embodiments, the actual achievable data rate for the user equipment 110 while in the E-UTRA-NR DC may be a function of (1) the LTE achievable bit rate in the non-standalone configuration and (2) the NR achievable bit rate in the non-standalone configuration. Non-standalone refers to a user equipment that is operating in for example dual connectivity, rather than in a standalone configuration using a single radio access technology. oreover, the LTE-NR category may be obtained from, or take into account, the user equipment's internal characteristics and/or capabilities of the LTE 106A and NR 106B components at the user equipment 110. In some example embodiments, the user equipment's 110 total Layer 2 buffer size may be taken into account to determine the achievable data rate. For example, the user equipment's 110 total Layer 2 buffer size may limit the achievable data rate.

In some example embodiments, the total Layer 2 buffer size may represent a limit to, and thus reduce, the achievable data rate on the secondary downlink to the user equipment while operating in the E-UTRA-NR DC configuration as shown in FIG. 2. Suppose for example, the Layer 2 buffer size of E-UTRA component (106A) and the Layer 2 buffer size of NR component (106B) contributes to the total Layer 2 buffer size of the user equipment's 110. The limitation may be used to determine the total achievable data rate is less than a simple sum of the two components.

The user equipment 110's LTE-NR category may differ from the individual, standalone categories for LTE (e.g., for a user equipment in standalone using the structure of FIG. 1A) and NR (e.g., for a user equipment in standalone using the structure of FIG. 1B) in terms of signaling as well. In some example embodiments, the eNodeB base station 117 may request and receive the E-UTRA-NR DC capability information including the LTE-NR category to enable a determination of the configuration of the user equipment and the corresponding bearers to provide the dual connectivity via the LTE/E-UTRA and NR.

In some example embodiments, the user equipment 110 may provide the user equipment's capabilities including the LTE-NR categories in response to a capabilities enquiry message from the eNB 117. The eNB base station 117 may request and receive, such as fetch, from user equipment 110 the E-UTRA-NR DC capability information including the LTE-NR category. The eNB 117 may be able to comprehend this information and thus use this capability information including the categories to determine the configuration of the user equipment and bearers for use in the dual connectivity. The eNB 117 may also use the E-UTRA-NR DC capability information and/or the LTE-NR category for standalone configurations as well, such when a single link to the user equipment is being used as in the case of for example a fallback in which the dual connectivity is not being used. Moreover, the eNB base station may signal the E-UTRA-NR DC capability information including the LTE-NR category to the core network, such as EPC 130, the 5G core network, and/or other nodes including the gNB 115.

In some example embodiments, the eNB base station 117 may, as noted, signal to gNB base station 115 the LTE-NR categories. For example, the gNB 115 may request and receive from the eNB 117 via control plane 166 the E-UTRA-NR DC capability information including the LTE-NR categories to enable a determination of the user equipment configuration and corresponding bearers to provide the dual connectivity via the LTE/E-UTRA and NR. The gNB 115 may also use the E-UTRA-NR DC capability information including the LTE-NR category in the case a fallback to, for example, the NR is needed. In dual connectivity for example, when the primary connectivity is lost to the eNB 117 or there is some other issue or failure with the establishment of the dual connectivity, the user equipment may fallback to another radio access technology such as the NR gNB 115 which can server as a primary/master node.

To illustrate further, the user equipment 110 (which is in the example of FIG. 2 is configured in the non-standalone, LTE assisted, NR dual connectivity configuration) may indicate to the network the user equipment's 110 capabilities including the user equipment's LTE-NR categories as part of the LTE-NR capability information in a way that eNB 117 and gNB 115 can understand, comprehend, and thus take action with respect to the dual connectivity configuration of the user equipment including its bearers. For example, the user equipment 110 may generate LTE-NR capabilities including the LTE-NR category so that the eNB 117 and gNB 115 can understand, comprehend, and configured the user equipment including its bearers for dual connectivity. The actual achievable data rate may be, as noted, a function of LTE achievable bit rate in a non-standalone configuration and NR achievable bit rate in the non-standalone configuration.

The capability information including the LTE-NR categories may be signaled in a way that is tailored for the LTE-NR dual connectivity configuration. Moreover, the user equipment's LTE-NR categories may be used to determine, as noted, an achievable data rate in the mixed, non-standalone LTE-NR deployment as depicted for example at FIG. 2. As noted, the achievable data rate (which may represent a maximum or peak) may be a function of LTE achievable bit rate in a non-standalone configuration and NR achievable bit rate in the non-standalone configuration. For example, the user equipment 110 may have an actual achievable data rate in accordance with the following: the achievable data rate (given the LTE-NR category for a user equipment) may be a function of the LTE achievable bit rate in the non-standalone configuration and the NR achievable bit rate in the non-standalone configuration. Moreover, the achievable data rate may, as noted, be obtained from the user equipment's internal characteristics/capabilities of LTE radio portion 106A and NR radio portions 106B including the total L2 buffer size.

In some example embodiments, the user equipment 110 may implement the LTE-NR capability information by at least generating a common part of the LTE-NR capabilities which can be understood by the eNB 117 and gNB 115 to enable configuring the user equipment 110 and the bearers for dual connectivity and, in particular, the UTRA-NR DC configuration.

The LTE-NR category may be a parameter having a value, such as an index, that denotes an achievable data rate. The LTE-NR category for the user equipment may enable a determination of the achievable data rate (which may be a peak or maximum data rate) in a given combination of the LTE/E-UTRA as a master node (e.g., eNB 117) and the 5G NR as a secondary node (e.g., gNB 115). For example, the LTE-NR category may map to an achievable data rate that is a function of the achievable bit rate via the LTE master node 117 in the non-standalone, dual connectivity shown at FIG. 2 and the achievable bit rate via the secondary node 115 in this non-standalone, dual connectivity. In this example, each component considered in the subset may pertain to the given combination (e.g., the LTE achievable bit rate reflects the throughput that can be obtained via master LTE cell group while the NR achievable bit rate reflects the throughput that can be obtained via secondary NR cell group (or the split) bearer). In the non-standalone configuration for example, the LTE/E-UTRA achievable bit rate may be equal to LTE achievable bit rate in the standalone configuration (e.g., when the user equipment is not in a dual connectivity and just transmits to the eNB). However, the NR achievable bit rate in the non-standalone configuration may be reduced somewhat compared to NR achievable bit rate in the standalone configuration (e.g., when the user equipment is not in a dual connectivity and as if NR was the only primary node) due to a variety of factors including transmission through the split bearer and reduced L2 buffer size. Thus, the LTE-NR category achievable data rate may be less than or equal to the maximum of the achievable bit rate via the LTE link combined with the achievable bit rate via NR the link.

Figure 3:
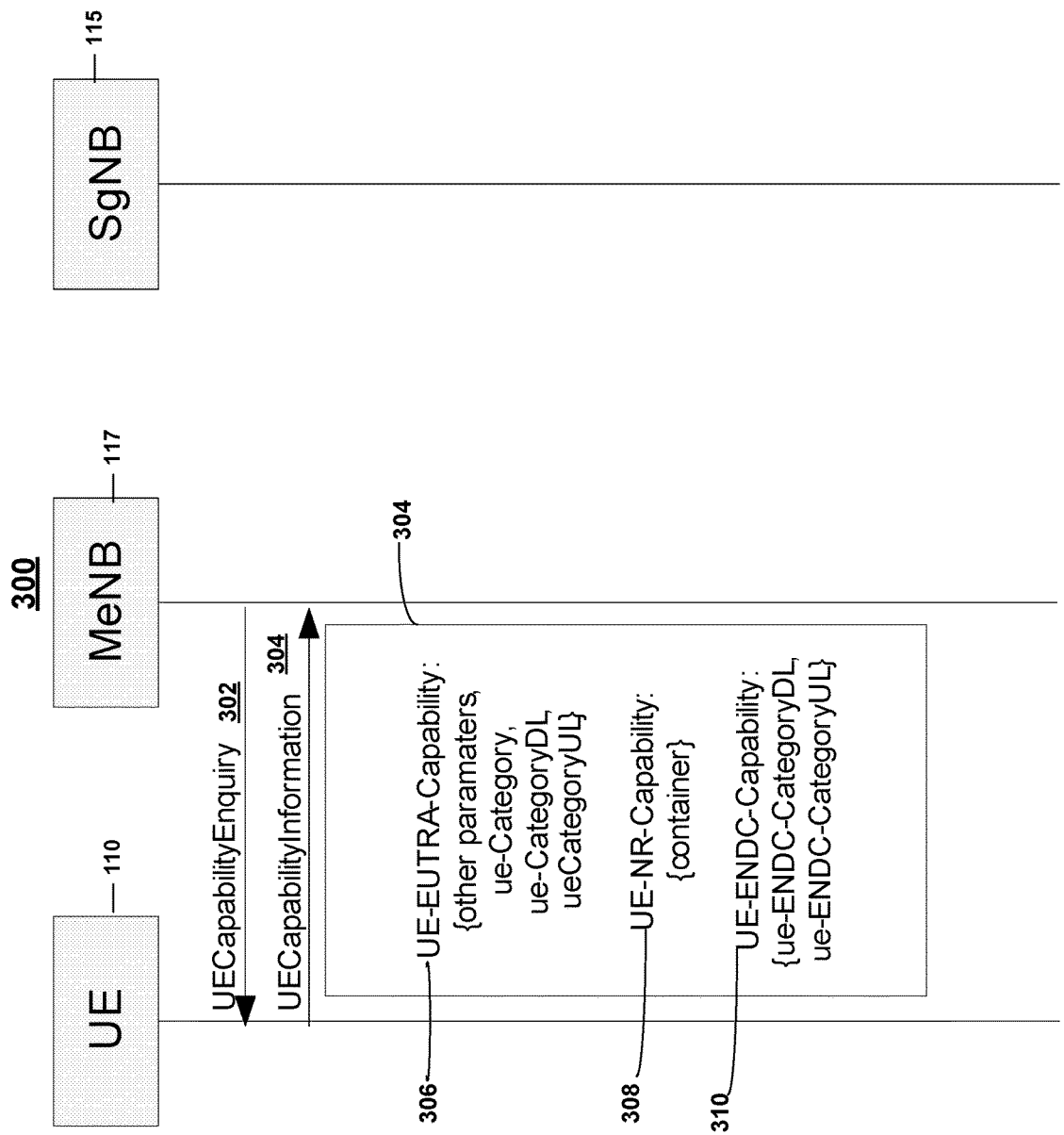
FIG. 3 depicts an example of a process for signaling a user equipment's capability information for the E-UTRA-NR dual connectivity configuration, in accordance with some example embodiments.

FIG. 3 depicts a signaling diagram 300, in accordance with some example embodiments. The signaling diagram depicts a user equipment, such as user equipment 110 in the non-standalone, E-UTRA-NR dual connectivity configuration as shown in FIG. 2. The signaling diagram also depicts a master node, such as eNB base station 117 (labeled MeNB), and a secondary node, such as gNB 117 (labeled SgNB).

At 302, the eNB 117 may send to user equipment 110 a UE capability enquiry message requesting the UE's capabilities, in accordance with some example embodiments. For example, the eNB may request and fetch the UE's capabilities for dual connectivity, which may include the LTE-NR category. Moreover, the eNB may be configured to comprehend the LTE-NR category information, and use this LTE-NR category information to determine the configuration of the user equipment for dual connectivity including the corresponding bearers (and/or a standalone configuration for fallback, for example). Moreover, the UE capability enquiry may be sent as part of radio resource control signaling between the eNB 117 and user equipment 110.

The user equipment 110 may respond, at 304, to the eNB 117 with the UE's capability information, in accordance with some example embodiments. The UE's capability information 304 may include the common LTE-NR category (or categories). The user equipment 110 may generate the common LTE-NR category to include the E-UTRA-NR dual connectivity capability information 310 including the LTE-NR category for the user equipment 110 so that both the eNB 117 and/or the gNB 115 can understand and take action such as configure the user equipment including the bearers for the achievable data rates for the E-UTRA-NR dual connectivity. The user equipment capability information including the categories may be provided in a capability information message signaled to the master base station as part of radio resource control.

The E-UTRA-NR DC capability information 310 may be implemented so that the capability information 310 is understood by at least the eNB base station 117 and/or gNB base station 115. The eNB 117 may configure, based on the LTE-NR category and corresponding achievable data rate, user equipment 110 for dual connectivity. Alternatively or additionally, the eNB 117 may, as noted, configure, based on the LTE-NR category, the standalone configuration (for example, to provide a fallback). The configuration may include dimensioning constraints, such as data rate, to avoid overestimating the UE's performance with respect to the data rate while in dual connectivity.

In the example of FIG. 3, the categories include "ue-ENDC-categoryDL" (which represents a downlink category which represents an achievable rate on the downlink) and "ue-ENDC-categoryUL" (which represents a downlink category which represents an achievable rate on the uplink). These categories may represent an index, a value, and/or the like denoting the achievable data rate on the link while in the E-UTRA-NR dual connectivity. Moreover, the categories may, as noted, be generated based on the LTE/E-UTRA achievable bit rate in a non-standalone configuration and NR achievable bit rate in the non-standalone configuration. And, the categories may, as noted, be generated based on the user equipment's internal characteristics/capabilities of LTE radio portion 106A and NR radio portions 106B including the total L2 buffer size.

FIG. 3 also shows that the capability information 304 may include additional information including the E-UTRA capability information 306 as described with respect to FIG. 1A and the NR capability information 308 as described with respect to FIG. 1B.

Figure 4:
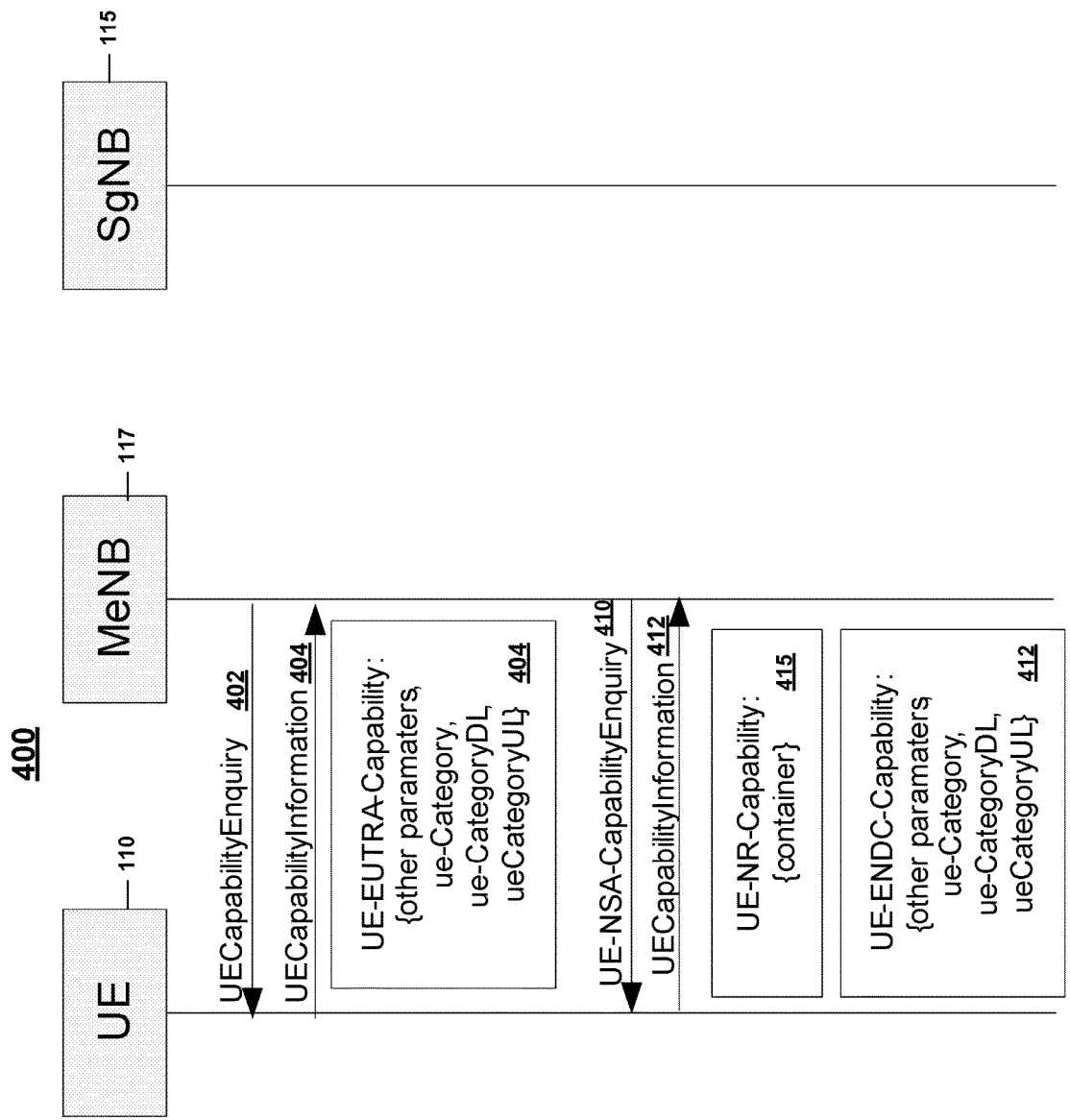
FIG. 4 depicts another example of a process for signaling a user equipment's capability information for the E-UTRA-NR dual connectivity configuration, in accordance with some example embodiments.

FIG. 4 depicts a signaling diagram 400, in accordance with some example embodiments. Like signaling diagram 300 at FIG. 3, the signaling diagram 400 depicts a user equipment, such as UE 110, in the non-standalone E-UTRA-NR dual connectivity configuration as shown in FIG. 2. The signaling diagram also depicts the master node, such as eNB base station 117 (labeled MeNB), and the secondary node, such as gNB 117 (labeled SgNB).

At 402, the eNB 117 may send to UE 110 a UE capability enquiry message requesting the UE's capabilities, in accordance with some example embodiments. The UE capability enquiry may be sent, for example, as part of radio resource control signaling between the eNB 117 and user equipment 110.

At 404, the UE 110 may respond to the eNB 117 with the user equipment's capability information 404 including the UE's E-UTRA's capability information 404, in accordance with some example embodiments.

At 410 however, the eNB 117 may send to the user equipment 110 a UE capability enquiry message requesting the UE's capabilities with respect to the non-standalone configuration, in accordance with some example embodiments. When this is the case, the user equipment 110 may respond, at 412, with the E-UTRA-NR dual connectivity capability information 410 including the LTE-NR categories, in accordance with some example embodiments. For example, the user equipment 110 may generate the LTE-NR categories based on the capabilities of the LTE radio portion 106A and/or the NR radio portion 106B. In the example of FIG. 4, the user equipment's categories include the "ue-Category" which represents the generic UE category denoting certain UL and DL capabilities, the "ue-CategoryDL which represents the downlink category, and the "ue-CategoryUL which represents the uplink categories. These categories may represent an index, a value, and/or the like denoting the achievable data rate on the link while in the E-UTRA-NR dual connectivity. Moreover, the categories may, as noted, be generated based on the LTE/E-UTRA achievable bit rate in a non-standalone configuration and NR achievable bit rate in the non-standalone configuration. And, the categories may, as noted, be generated based on the user equipment's internal characteristics/capabilities of LTE radio portion 106A and NR radio portions 106B including the total L2 buffer size.

In the example of FIG. 4, the user equipment 110 may also respond, at 415, with the NR capability information including category information.

In the examples of FIGS. 3 and/o 4, the eNB 117 may signal the core network and/or the gNB 115 with the capability information including the LTE-NR category information. The gNB may fetch capability information including the LTE-NR category information. Further, the gNB may be able to comprehend them and use this capability information to determine user equipment's configuration and bearer configuration. The gNB may also request the capability information including the LTE-NR category, and may be able to use the LTE-NR category as a fallback category to be used if there is a fallback to another radio access technology such as NR.

Figure 5:
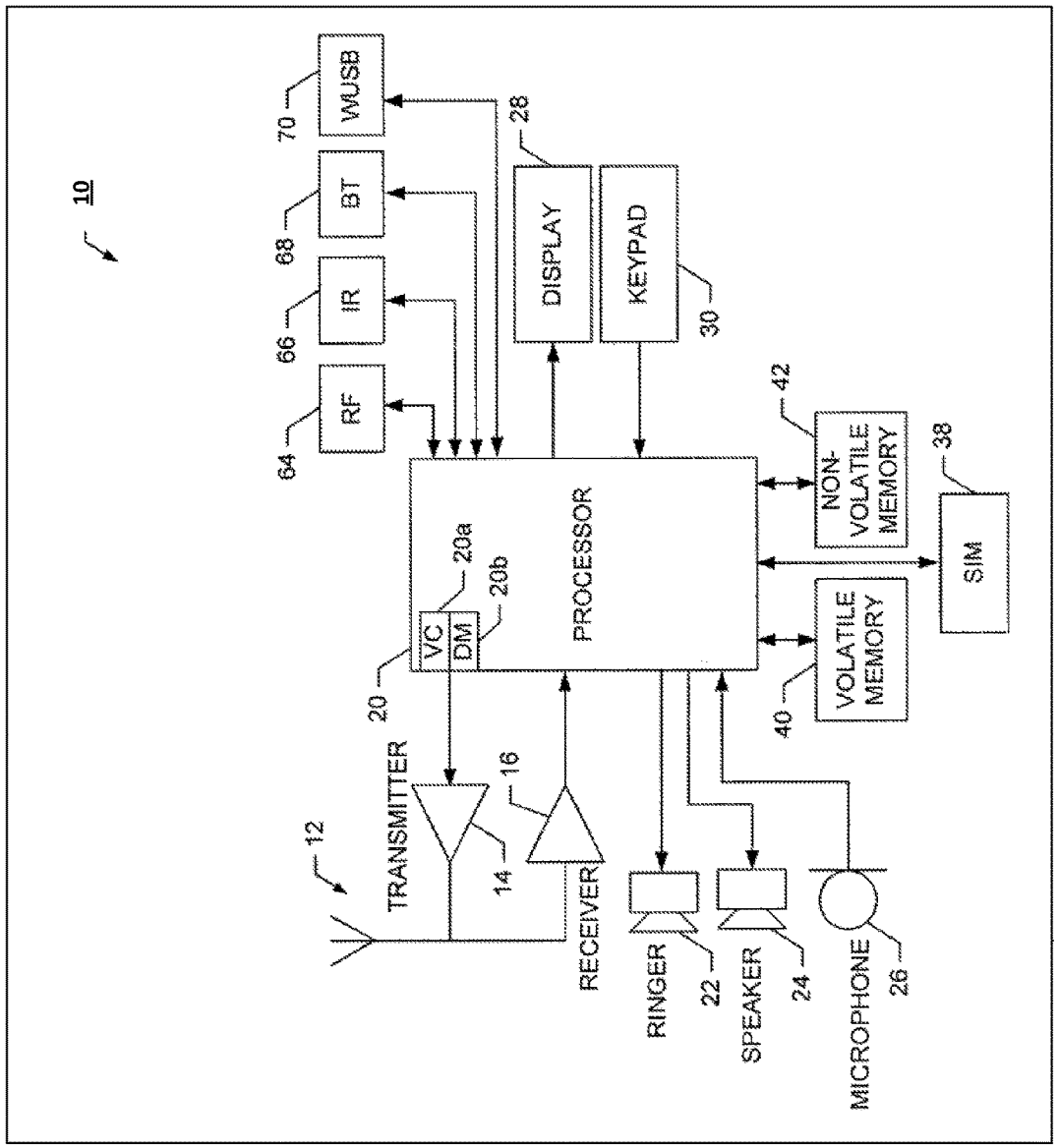
FIG. 5 depicts an example of an apparatus, in accordance with some example embodiments.

FIG. 5 illustrates a block diagram of an apparatus 10, in accordance with some example embodiments The apparatus 10 may represent a user equipment, such as the user equipment 110. For example, the apparatus 10 may be configured as user equipment 110 to signal the LTE-NR category as described with respect to FIGS. 3 and 4, for example.

Alternatively or additionally, one or more portions of the apparatus 10 may be used to implement a network node, such as a base station, a core network node, and/or the like. When this is the case, apparatus 10 may provide the eNB 117 and/or gNB 115 described with respect to FIGS. 3 and 4, for example. When this is the case, the master base station 117 may provide a request for capability information to a user equipment in dual connectivity with the master base station and with a secondary base station 115. The master base station 117 may receive capability information including the category information indicating, to the master base station as well as the secondary base station 115, an achievable data rate for the user equipment over the dual connectivity. The master base station 117 may configure, based on the category information, the achievable data rate over a first link to the master base station and/or a second link to the secondary base station in order to configure the dual connectivity. Alternatively or additionally, the request for capability information may request capability information from the user equipment for operation in a non-standalone, dual connectivity configuration. Alternatively or additionally, the category information may indicate the achievable data rate over a first downlink from the master base station to the user equipment, a first uplink from the user equipment to the master base station, a second downlink from the secondary base station to the user equipment, and/or a second uplink from the user equipment to the secondary base station. Alternatively or additionally, the category information may also indicate the achievable data rate at a split to the secondary base station. Alternatively or additionally, the achievable data rate may be based on a total layer 2 buffer size at the user equipment. Alternatively or additionally, the user equipment capability information including the category information may be received in a capability information message signaled to the master base station as part of radio resource control. Alternatively or additionally, the received capability information may further include categories for standalone operation by the user equipment over the Evolved UMTS Terrestrial Radio Access Network and/or standalone operation over the fifth generation radio access network. Alternatively or additionally, the achievable data rate may represent a maximum data rate and/or a peak data rate that can be provided by the user equipment.

The apparatus 10 may include at least one antenna 12 in communication with a transmitter 14 and a receiver 16. Alternatively transmit and receive antennas may be separate. The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s)

without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 5 as a single processor, in some example embodiments the processor 20 may comprise a plurality of processors or processing cores.

The apparatus 10 may be capable of operating with one or more air interface standards, communication protocols, modulation types, access types, and/or the like. Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, 802.3, ADSL, DOCSIS, and/or the like. In addition, these signals may include speech data, user generated data, user requested data, and/or the like.

For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, fifth-generation (5G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced, 5G, and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20*a*, an internal data modem (DM) 20*b*, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 5, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth™ (BT) transceiver 68 operating using Bluetooth™ wireless technology, a wireless universal serial bus (USB) transceiver 70, a Bluetooth™ Low Energy transceiver, a ZigBee transceiver, an ANT transceiver, a cellular device-to-device transceiver, a wireless local area link transceiver, and/or any other short-range radio technology. Apparatus 10 and, in particular, the short-range transceiver may be capable of transmitting data to and/or receiving data from electronic devices within the proximity of the apparatus, such as within 10 meters, for example. The apparatus 10 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), an eUICC, an UICC, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing operations disclosed herein including, for example, process 300, 400, and/or the like.

The memories may comprise an identifier, such as an international mobile equipment identification (IMEI) code, capable of uniquely identifying apparatus 10. The memories may comprise an identifier, such as an international mobile equipment identification (IMEI) code, capable of uniquely identifying apparatus 10. In the example embodiment, the processor 20 may be configured using computer code stored at memory 40 and/or 42 to control and/or provide one or more aspects disclosed herein (see, e.g., process 300, 400, and/or other operations/functions disclosed herein).

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 5, computer-readable medium may comprise a non-transitory computer-readable storage medium that may be any media that can contain or store the instructions for use by or in connection with an instruction execution system, apparatus, or device, such as a computer.

Without in any way limiting the scope, interpretation, or application of the claims appearing below, a technical effect of one or more of the example embodiments disclosed herein may be enhanced dual connectivity operation of a user equipment.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "computer-readable medium" refers to any computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. Other embodiments may be within the scope of the following claims.

If desired, the different functions discussed herein may be performed in a different order and/or concurrently with each other. Furthermore, if desired, one or more of the above-described functions may be optional or may be combined. Although various aspects of some of the embodiments are set out in the independent claims, other aspects of some of the embodiments comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of some of the embodiments as defined in the appended claims. Other embodiments may be within the scope of the following claims. The term "based on" includes "based on at least." The use of the phase "such as" means "such as for example" unless otherwise indicated.

What is claimed:

1. A method comprising:
receiving, by a user equipment which is in dual connectivity with a master base station providing an Evolved UMTS Terrestrial Radio Access Network and with a secondary base station providing a next generation radio access network, a request for capability information;
generating, by the user equipment, category information, the category information generated by the user equipment is based on at least a total layer 2 buffer size at the user equipment, the category information indicating, to the master base station and the secondary base station, a maximum achievable data rate for the user equipment over the dual connectivity, the category information being common to both the Evolved UMTS Terrestrial Radio Access Network and the next generation radio access network, wherein the category information indicating the maximum achievable data rate for the user equipment over the dual connectivity is further generated based on at least a first achievable data rate between the user equipment and the master base station operating in a non-standalone, dual connectivity configuration over the Evolved UMTS Terrestrial Radio Access Network and a second achievable data rate between the user equipment and the secondary base station operating in the non-standalone, dual connectivity configuration over the next generation radio access network; and providing, by the user equipment, capability information to the master base station, the capability information including the generated category information.

2. The method of claim 1, wherein the request for capability information comprises a capability enquiry message.

3. The method of claim 1, wherein the user equipment capability information is provided in a capability information message signaled to the master base station as part of radio resource control, wherein the same category information enables the master base station and the secondary base station to comprehend and configure the dual connectivity.

4. The method of claim 1, wherein the provided capability information further includes categories for standalone operation by the user equipment over the Evolved UMTS Terrestrial Radio Access Network and/or standalone operation over the next generation radio access network.

5. An apparatus comprising:
at least one processor; and
at least one memory including computer program code, the at least one memory and the computer program code configured to, with the at least one processor, cause the apparatus to at least:
receive, by the apparatus which is in dual connectivity with a master base station providing an Evolved UMTS Terrestrial Radio Access Network and with a secondary base station providing a next generation radio access network, a request for capability information;
generate category information, the category information generated is based on at least a total layer 2 buffer size at the apparatus, the category information indicating, to the master base station and the secondary base station, a maximum achievable data rate for the apparatus over the dual connectivity, the category information being common to both the Evolved UMTS Terrestrial Radio Access Network and the next generation radio access network, wherein the generated category information indicating the maximum achievable data rate for the apparatus over the dual connectivity is generated based on a first achievable data rate between the apparatus and the master base station operating in a non-standalone, dual connectivity configuration over the Evolved UMTS Terrestrial Radio Access Network and a second achievable data rate between the apparatus and the secondary base station operating in the non-standalone, dual connectivity configuration over the next generation radio access network; and
provide capability information to the master base station, the capability information including the generated category information.

6. The apparatus of claim 5, wherein the request for capability information comprises a capability enquiry message.

7. The apparatus of claim 5, wherein the request indicates the request is for operation in a non-standalone, dual connectivity configuration.

8. The apparatus of claim 5, wherein the apparatus capability information is provided in a capability information message signaled to the master base station as part of radio resource control, wherein the same category information enables the master base station and the secondary base station to comprehend and configure the dual connectivity.

9. The apparatus of claim 5, wherein the provided capability information further includes categories for standalone operation by the apparatus over the Evolved UMTS Terrestrial Radio Access Network and/or standalone operation over the next generation radio access network.

10. An apparatus comprising:
at least one processor; and
at least one memory including computer program code, the at least one memory and the computer program code configured to, with the at least one processor, cause the apparatus to at least:
send, by the apparatus providing an Evolved UMTS Terrestrial Radio Access Network, a request for capability information to a user equipment in dual connectivity with the apparatus and with a secondary base station providing a next generation radio access network;
receive capability information including category information indicating, to the apparatus, a maximum achievable data rate for the user equipment over the dual connectivity, the category information is generated based on at least a total layer 2 buffer size at the user equipment, the category information being common to both the Evolved UMTS Terrestrial Radio Access Network and the next generation radio access network, wherein the category information indicates the maximum achievable data rate over a first downlink from the apparatus to the user equipment, a first uplink from the user equipment to the apparatus, a second downlink from the secondary base station to the user equipment, and/or a second uplink from the user equipment to the secondary base station; and
configure, based on the category information, the maximum achievable data rate over a first link to the apparatus and/or a second link to the secondary base station in order to configure the dual connectivity.

11. The apparatus of claim 10, wherein the apparatus is further caused to at least send to the secondary base station the received category information indicating to the secondary base station the achievable data rate for the user equipment over the dual connectivity.

12. The apparatus of claim 10, wherein the request for capability information requests capability information from the user equipment for operation in a non-standalone, dual connectivity configuration.

13. The apparatus of claim 10, wherein the category information indicates the maximum achievable data rate at a split to the secondary base station.

14. The apparatus of claim 10, wherein the user equipment capability information including the category information is received in a capability information message signaled to the apparatus as part of radio resource control, and/or wherein the same category information enables the master base station and the secondary base station to comprehend and configure the dual connectivity.

15. The apparatus of claim 10, wherein the maximum achievable data rate represents a maximum data rate and/or a peak data rate that can be provided by the user equipment, and/or wherein the apparatus comprises, or is comprised in, a master base station, and/or wherein the next generation radio access network represents a fifth generation access network and/or a new radio access network.

\* \* \* \* \*